United States Patent [19]
Metlitsky et al.

[11] Patent Number: 5,306,900
[45] Date of Patent: * Apr. 26, 1994

[54] HAND HELD BAR CODE SCANNER WITH ADJUSTMENT OF DIRECTION OF EMITTED LIGHT BEAM

[75] Inventors: Boris Metlitsky, Stony Brook; Mark Krichever, Hauppauge; Ed Barkan, S. Setackel; Howard M. Shepard, Great Neck; Jerome Swartz, Old Field, all of N.Y.; Joseph Sander, Balboa Island, Calif.

[73] Assignee: Symbol Technologies, Inc., Bohemia, N.Y.

[*] Notice: The portion of the term of this patent subsequent to Sep. 1, 2009 has been disclaimed.

[21] Appl. No.: 881,280

[22] Filed: May 11, 1992

Related U.S. Application Data

[60] Division of Ser. No. 699,417, May 13, 1991, Pat. No. 5,191,197, which is a continuation-in-part of Ser. No. 193,265, May 11, 1988, Pat. No. 5,144,120.

[51] Int. Cl.⁵ .............................................. G06K 7/10
[52] U.S. Cl. ..................................... 235/462; 235/472
[58] Field of Search ........................ 235/462, 467, 472

[56] References Cited
U.S. PATENT DOCUMENTS

| | | | |
|---|---|---|---|
| 4,409,470 | 10/1983 | Shepard et al. | 235/435 |
| 4,496,831 | 1/1985 | Swartz et al. | 235/472 |
| 4,560,862 | 12/1985 | Eastman et al. | 235/472 |
| 4,621,189 | 11/1986 | Kumar et al. | 235/472 |
| 4,743,773 | 5/1988 | Katana et al. | 235/472 |
| 4,930,848 | 6/1990 | Knowles | 235/472 |
| 4,939,356 | 7/1990 | Rando et al. | 235/467 |
| 5,105,070 | 4/1992 | Wike, Jr. et al. | 235/467 |
| 5,144,120 | 9/1992 | Krichever | 235/462 |

FOREIGN PATENT DOCUMENTS

| | | | |
|---|---|---|---|
| 168282 | 8/1985 | Japan | 235/462 |
| 144681 | 6/1990 | Japan | 235/472 |
| 231689 | 12/1990 | Japan | 235/462 |

*Primary Examiner*—John Shepperd

[57] ABSTRACT

In bar code symbol scanning systems employing laser, optical and sensor components a superstructure mounted on a housing and having a movable exit port to adapt the housing to steer a laser beam through the exit port to a particular course. Both right and left handed users are thereby accommodated.

26 Claims, 3 Drawing Sheets

FIG. 1A
FIG. 1B
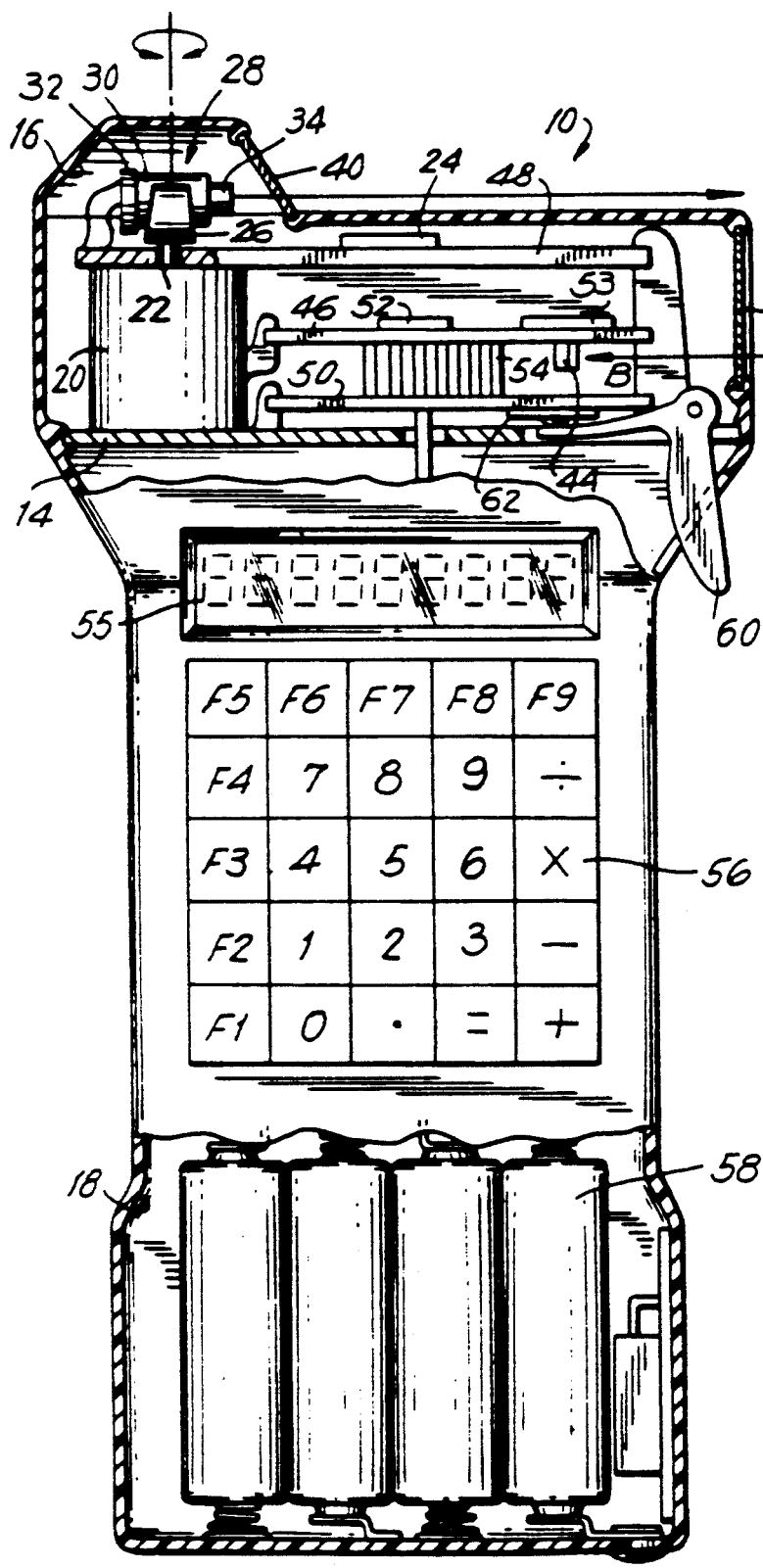
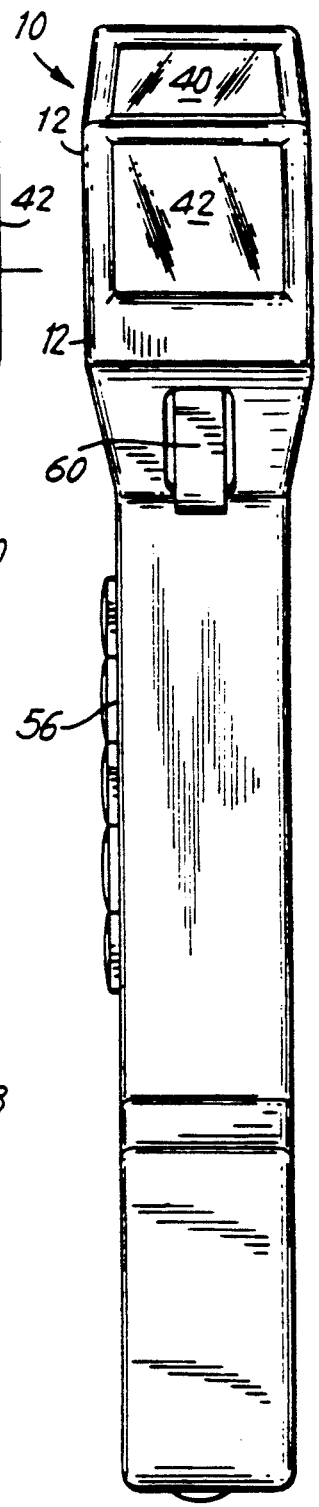

HAND HELD BAR CODE SCANNER WITH ADJUSTMENT OF DIRECTION OF EMITTED LIGHT BEAM

This is a division of application Ser. No. 07/699,417, filed May 13, 1991, now U.S. Pat. No. 5, 1991, 1997, which is a continuation-in-part of Ser. No. 193,265, filed May 11, 1988, now U.S. Pat. No. 5,144,120.

BACKGROUND OF THE INVENTION

1. Field of the Invention

This invention generally relates to laser scanner systems for reading indicia of different light reflectivity such as bar code symbols and, more particularly, to hand held scanners.

2. Description of Related Art

Laser scanner systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,806,742; 4,845,350; as well as U.S. application Ser. Nos. 148,669 and 147,708—all of said patents and patent applications being owned by the assignee of the instant invention and being incorporated by reference herein—have generally been designed to read indicia having parts of different light reflectivity, e.g. bar code symbols, particularly of the Universal Product Code (UPC) type, at a certain working or reading distance from a hand-held or stationary scanner.

Typically, a light source such as a laser generates a light beam which is optically modified to form a beam spot of a certain size at the working distance and is directed by optical components along a light path toward a bar code symbol located in the vicinity of the working distance for reflection from the symbol. A photodetector having a field of view extending across and slightly past the symbol detects light of variable intensity reflected off the symbol and generates electrical signals indicative of the detected light. These electrical signals are decoded into data descriptive of the symbol. A scanning component is situated in the light path. The scanning component may either sweep the beam spot across the symbol and trace a scan line across and past the symbol, or scan the field of view of the photodetector, or do both.

In any case, the scanner typically includes a moving mirror. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion, the multi-mirror construction being repetitively and reciprocally driven in alternate circumferential directions about a drive shaft on. which the multi-mirror construction was mounted.

No matter what the shape or orientation of the mirror, the known scanning components employed in laser scanning systems moved mirrors to perform the aforementioned sweeping and scanning actions. Moving other laser scanning system components was not thought to be practical. Thus, moving a gas laser tube was unthinkable, particularly in hand-held, compact system applications, due to the large size and the requisite large room necessary to accommodate a moving gas laser tube. Moving an optical lens was also not thought to be desirable, because optical alignment is critical in laser scanning systems. Hence, it was the mirror that was typically designated to effect the sweeping/scanning functions. However, in some laser scanning applications, mirror movements have not been found to be altogether desirable.

In non-laser scanning systems of the type exemplified by U.S. Pat. No. 4,578,571, a non-laser light emitting diode, an optical assembly, a photodetector, and electronic preamplifier/filter circuitry are all fixedly mounted on a common support that is connected to a cantilevered bimorph which is reciprocatingly driven to jointly move all the aforementioned components back and forth over a bar code symbol to be scanned. The large volume and heavy mass of all the commonly-mounted non-laser system components requires the expenditure of a great deal of power for the drive. This is not altogether practical in those cases, e.g. battery-powered operation, where power consumption is to be held to a minimum. Also, moving only one or more non-mirrored system components relative to another for conserving power was heretofore not considered desirable, because of the optical alignment problems described above.

SUMMARY OF THE INVENTION

1. Objects of the Invention

It is a general object of this invention to advance the state of the art of scanner systems for reading indicia of different light reflectivity, particularly laser scanner system for reading bar code symbols.

Another object of this invention is to accommodate both right and left handed users of hand held scanner systems.

2. Features of the Invention

In keeping with these objects, and others which will become apparent hereinafter, one feature of this invention resides, briefly stated, in a superstructure mounted on a housing for movement together with a exit port through which a laser beam is steered along a desired course, thereby enabling right and left handed users to be accommodated.

The novel features which are considered as characteristic of the invention are set forth in particular in the appended claims The invention itself, however, both as to its construction and its method of operation, together with additional objects and advantages thereof, best will be understood from the following description of specific embodiments when read in connection with the accompanying drawings.

BRIEF DESCRIPTION OF THE PREFERRED EMBODIMENTS

FIG. 1A is a partly broken-away, partly sectioned side view of a hand-held light scanning system in which a mirrorless scanner arrangement in accordance with this invention is housed;

FIG. 1B is an end view of FIG. 1A;

DETAILED DESCRIPTION OF THE PREFERRED EMBODIMENTS

Figure 2:
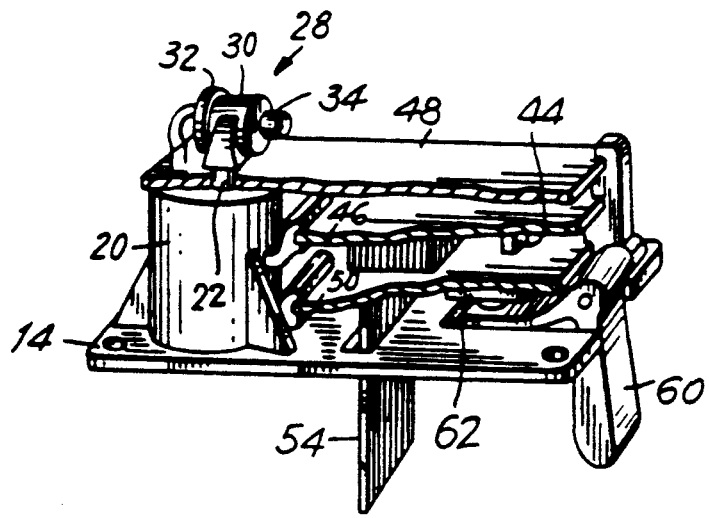
FIG. 2 is a front perspective view of the mirrorless scanner arrangement of FIG. 1A.

Referring now to the drawings, reference numeral 10 in FIGS. 1A and 1B generally identifies an arrangement in a scanner system of the type generally described in the above identified patents and patent applications, the entire contents of all of which are hereby incorporated by reference herein, for reading symbols, particularly UPC bar code symbols. As used in this specification and the following claims, the term "symbol" is intended to be broadly construed and to cover not only symbol patterns composed of alternating bars and spaces, but also other patterns, as well as alpha-numeric characters and, in short, any indicia having portions of different light reflectivity.

The arrangement 10 comprises a hand-held housing 12 having a base 14 which subdivides the interior of the housing into an upper half 16 and a lower half 18. A lightweight, high-speed, miniature scanning motor 20 similar to that described in U.S. Pat. No. 4,496,831 is mounted on base 14. The motor 20 has an output shaft 22 which is repetitively driven in alternate circumferential directions about an axis along which the shaft extends over arc lengths less than 360° in each direction. Structural, functional and operational aspects of the motor 20 and of control circuitry 24 for the motor are set forth in detail in U.S. Pat. No. 4,496,831 and, hence, for the sake of brevity, will not be repeated herein.

One difference between the motor 20 of this invention and the motor of U.S. Pat. No. 4,496,831 is the superstructure that is mounted on the output shaft 22. Instead of a planar mirror as taught by said patent, the invention proposes, in FIG. 1A, mounting a generally U-shaped support 26 at the end of the shaft 22, and mounting a laser/optics subassembly 28 on the support 26. The subassembly 28 and the support 26 are jointly oscillated and turned with the shaft 22.

Figure 3:
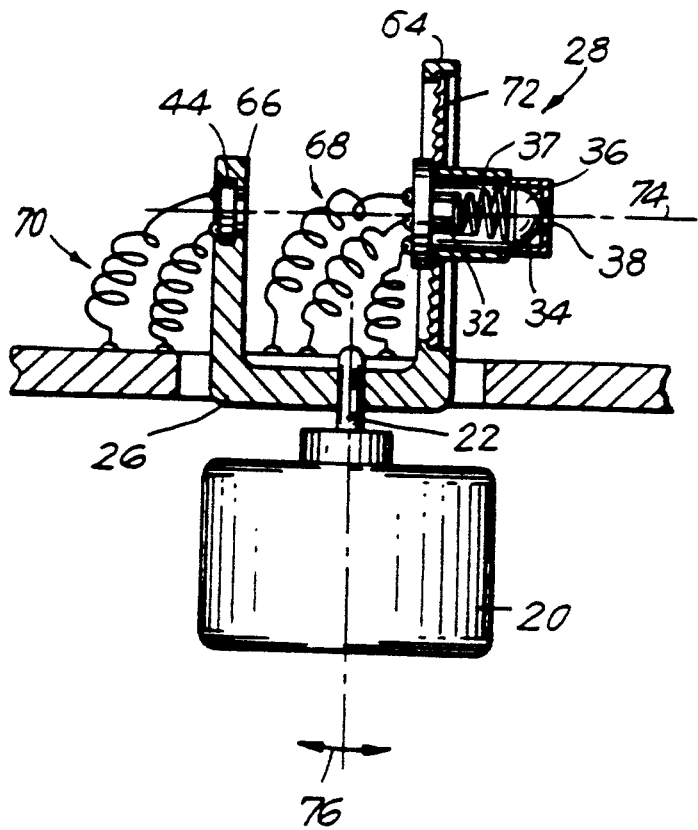
FIG. 3 is a partly sectioned side view of a mirrorless scanner arrangement in accordance with another embodiment of this invention.

The subassembly 28 includes an elongated hollow tube 30, a laser diode 32 fixedly mounted at one axial end region of the tube 30, a lens barrel 34 mounted at the opposite axial end region of the tube 30, and a focusing lens 36 mounted within the barrel (see FIG.3). The focusing lens 36 is preferably a plano-convex lens, but may be spherical, convex or cylindrical as well. The barrel 34 has an end wall formed with an aperture stop 38 which is an opening extending through the end wall. The barrel 34 is mounted for longitudinal telescoping movement within and along the tube 30. The lens 36 is situated adjacent the end wall of the barrel and is mounted for joint movement with the barrel. The position of the barrel and, in turn, of the lens relative to the diode is fixed typically by gluing or clamping, at the assembly site so that a known distance between the lens and the aperture stop, on the one hand, and between the lens, the aperture stop and the diode, on the other hand, is obtained. A coil spring 37 (see FIG. 3) is located within and extends along the barrel and tube, and has one coil end bearing against the diode, and another coil end bearing against a planar side of the lens. The spring urges the lens against the end wall having the aperture stop, thereby fixedly locating the lens relative to the aperture stop.

The subassembly 28, per se, forms no part of this invention and, in fact, is described and claimed in U.S. Pat. No. 4,816,660 to which reference can be had for further structural, functional and operational aspects of the subassembly. It is sufficient for this invention to understand that the subassembly 28 includes a solid-state laser diode 32 operative for propagating and generating an incident laser beam, either in the invisible or visible light range, and the combination of a focusing lens and an aperture stop together operative for focusing the laser beam to have a beam cross-section or beam spot of a certain waist size within a range of working distances relative to the housing 12. The focused beam passes through the aperture stop 38 and through a scan window 40 on the housing in the vicinity of a reference plane located exteriorly of the housing within the range of working distances along an outgoing optical path.

During the alternate, repetitive oscillations of the shaft 22, the support 26 and the subassembly 28 likewise participate in this oscillatory movement, thereby causing the beam spot to be swept in an arc whose center of curvature is located at the diode across the symbol at the reference plane and to trace a curved scan line thereat. Hence, no longer is a mirror used to effect sweeping of a beam spot across a symbol, but, instead, other scanner components are moved and, in the embodiment of FIG. 1A, there other components comprise the laser diode 32 and the optical components which are jointly turned as a unitary structure about an axis parallel to the reference plane.

A portion of the light reflect off the symbol passes along a return path through a second window 42 on the housing in the direction of arrow B to a photodetector 44 for detecting the variable intensity of the returning portion of the reflected laser light over a field of view, and for generating an electrical analog signal indicative of the detected variable light intensity. In the FIG. 1A embodiment, the photodetector 44 is stationarily mounted on the printed circuit board 46. Printed circuit boards 48 and 50 at either side of board 46 contain signal processing circuitry 52 and microprocessor control circuitry 53 for converting the analog electrical signal to a digital signal, and for processing the digital signal to data descriptive of the symbol being read. Details of the signal processing and microprocessor control circuitry can be had by reference to the above-identified patents and applications.

A two-part multi-wire plug-in cable connector 54 has one part electrically connected to the signal processing and microprocessor control circuitry and another part electrically connected to a flexible multi-wire cable 54' connected to a display 55 and a keyboard 56. A rechargeable battery pack 58 supplies power to the laser diode and the electrical circuitry in the housing. By moving only the laser diode and the optical component relative to the stationary photodetector, power from the battery pack is conserved.

Means for initiating reading may advantageously include a trigger 60 mounted on the housing 12. The trigger extends in part outwardly of the housing to be manually actuated by a user who is holding the housing 12 in his hand. The trigger is operatively connected through trigger switch 62 and actuates the laser diode 32, the motor 20, the photodetector 44, the signal processing circuitry 52 and the control circuitry 53 to initiate a reading of the symbol. The trigger is actuated once for each symbol to be read, each symbol in its respective turn. Once the control circuitry determines that the symbol has been successfully decoded, the control circuitry terminates the reading of the symbol and deactuates the previously actuated components in the housing and readies the system for the next symbol.

FIG. 2 illustrates the various electrical, mechanical and optical components assembled as a modular unit prior to mounting in the upper half 16 of the housing 12 of FIGS. 1A, 1B. The electrical circuitry on the printed circuit boards 46, 48, 50, as well as on base 14, has been omitted from FIG. 2 for the sake of clarity.

Turning now to FIG. 3, like parts with that of FIG. 1A have been identified with like reference numerals. The oscillating motor 20, once again, has an output shaft 22 on which a generally U-shaped support 26 is mounted. A laser/optics subassembly 28 is mounted on one leg 64 of the support. A photodetector 44 is mounted on another leg 66 of the support. Coiled tensile wire groups 68, 70 connect the diode 32 and the photodetector 44 to the non-illustrated electrical circuitry on printed circuit board 48. Although coiled wires have been illustrated, other types of electrical connectors, e.g. flat cable, could be employed. A collecting lens 72 is mounted on leg 64 and coaxially surrounds subassembly 28. The lens 72, the subassembly 28 and the photodetector 44 all have a common boresight or optical axis 74 along which the optical and return paths are co-linear and are all oscillatable as a unit in alternate circumferential directions (see double-headed arrow 76) about the axis along which shaft 22 extends.

Figure 4:
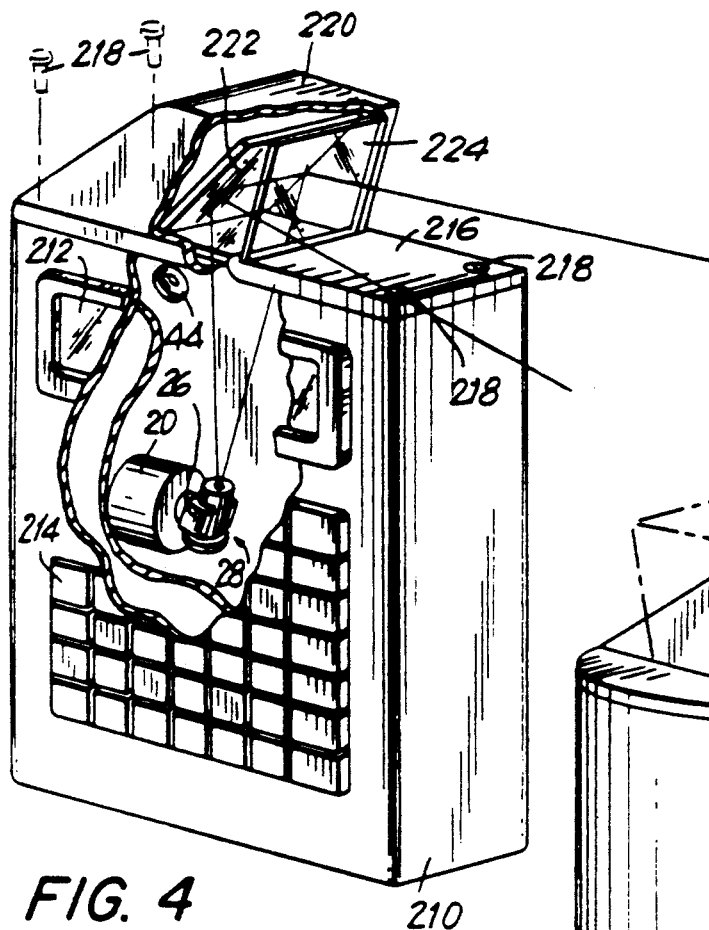
FIG. 4 is a partly broken-away, perspective view of a hand-held scanning system for use with the mirrorless scanning arrangement.

FIG. 4 shows the compact laser/optics subassembly 28 mounted on the reciprocating motor 20, as described above, installed in a hand-held housing 210 equipped with a display 212 and a keyboard 214. The housing 210 has a rectangular cross-section and, at its top, is provided with a superstructure that enables scanning to be performed to the right or, in another mode of operation, to the left of the housing.

The housing 210 has a top rectangular wall 216 fixedly mounted in place with the aid of four screws 218 at the corners of the top wall. A hood 220 is mounted at one end of the top wall. A stationary reflecting mirror 222 is located within the confines of the hood above the top wall 216. A scan window 224 closes the interior of the hood from the environment. The mirror 222 is positioned in the path of the emitted laser beam emanating from the laser/optics subassembly 28, and redirects the laser beam toward one side, e.g. toward the right side, of the housing. Returning light from the symbol being read passes through the window 224 and is collected by photodetector 44.

By removing the four screws 218, turning the superstructure by 180°, replacing the screws 218, the scanning arrangement will work just as described above, except that, this time, the mirror 222 will redirect the laser beam toward the other side, e.g. toward the left side, of the housing. In this way, right- and left-handed users can be accommodated.

Figure 5:
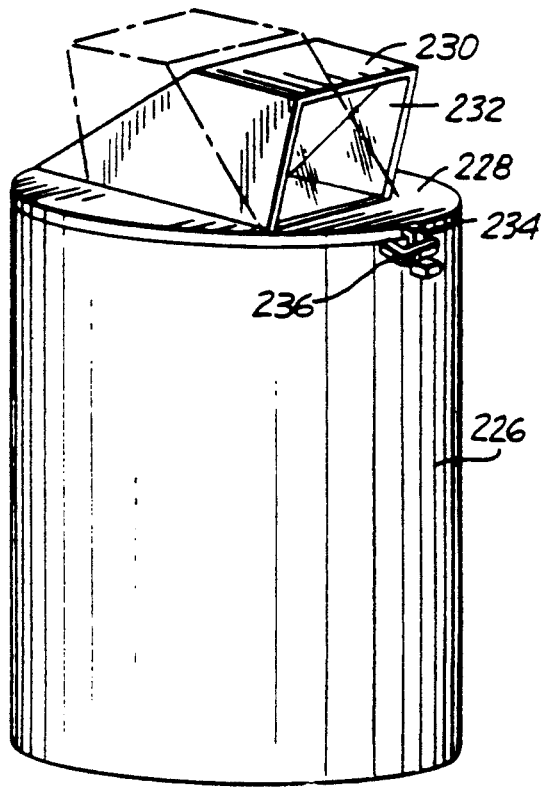
FIG. 5 is a perspective view of a hand-held, swivel-type scanning system for use with the mirrorless scanning arrangement.

To the same effect is the structure shown in FIG. 5 in which the emitted beam can also be directed toward the right or the left. A housing 226 of cylindrical cross-section has a circular top wall 228 on which a hood 230 is supported. A reflecting mirror identical to mirror 222 is mounted within hood 230. A scan window 232 closes the hood 230. An L-shaped locking lug 234 depends from the top wall 228 and, in the illustrated position, lockingly engages a hook 236 provided on the circular side wall of the housing 226. The same laser/optics subassembly shown in FIG. 4 is mounted within housing 226. The laser beam is propagated toward the right in FIG. 5.

To accommodate the user, the top wall 228 and hood 230 can be turned to the position shown in phantom lines until the lug 234 engages another non-illustrated hook spaced 180° away from hook 236. In this locked position, the laser beam is propagated toward the left in FIG. 5. The swiveling of a locking lug to engage one or the other of two hooks with a snap-type action is somewhat easier to perform than the removal and replacement of screws as described for FIG. 4.

Figure 6:
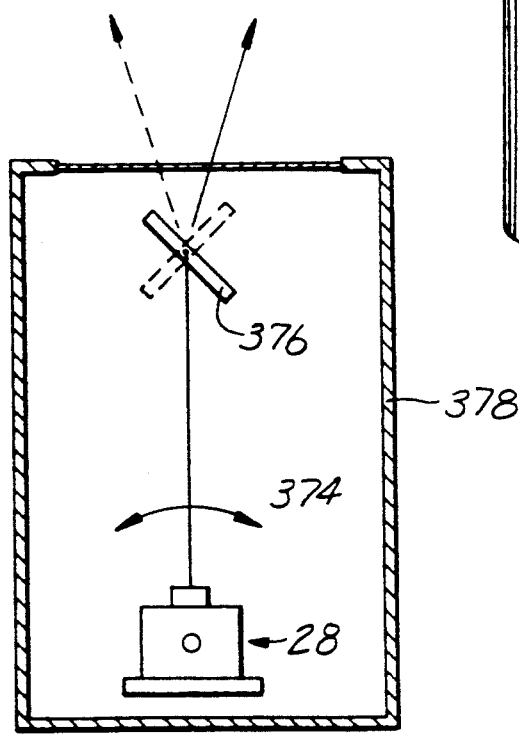
FIG. 6 is a top plan view of a scanning system adapted to accommodate right- and left-handed users.

FIG. 6 depicts another arrangement for accommodating right-handed and left-handed users, as previously discussed in connection with FIGS. 4 and 5. A laser/optics assembly 28, as previously described, is oscillated during scanning in the directions of the double-headed arrow 374. A light-directing element 376, preferably of light-transmissive material, is positioned in the light path of the light beam emanating from the assembly 28. The element 376 is positioned in either the solid-line or the dashed-line position, with the aid of a handle extending exteriorly of the housing 378. In the solid-line position, the element 376 steers the light beam about 10°–15° off to the right of its straightline path to accommodate left-handed users. In the dashedline position, the element 376 steers the light beam about 10°–15° off to the left of its straight-line path to accommodate right-handed users.

What is claimed as new and desired to be protected by Letters Patent is set forth in the appended claims.

We claim:

1. A hand held bar code reader comprising:
   (a) a hand held main body portion including a bar code reader, said main body portion having a major axis;
   (b) a beam directing portion connected to said body portion for directing a light beam originating in said body portion to exit said reader through a window in said beam directing portion; said body portion and said beam directing portion being adapted to be rotated with respect to each other, such that said beam directing portion may face in at least two different directions with respect to the major axis of said main body portion.

2. The hand held bar code reader of claim 1, wherein said main body portion includes a display and a keyboard, said beam directing portion being connected to said main body portion with the orientation of the connection of said main body portion and said window beam directing portion being in one of two positions depending on whether the user holds the body portion with the right or left hand.

3. The hand held bar code reader claim 2 wherein the preferred orientations of the connection of said main body portion and said beam directing portion is such that the light beam is directed parallel to the plane of keyboard.

4. A scanning arrangement in a light scanning system for reading indicia having parts of different light reflectivity, comprising;
   (a) a light source component for emitting a light beam;
   (b) an optical component for optically modifying and directing the light beam along an optical path toward indicia located in the vicinity of a reference plane exteriorly of the system;

(c) a photodetector component having a field of view and operative for detecting at least a portion of light of variable intensity reflected off the indicia, and for generating an electrical signal indicative of the detected light intensity;

(d) a scanning component for scanning at least one of the light beam and the field of view;

(e) an electrical connecting component for conducting the electrical signal away from the photodetector component;

(f) all of said components being mounted together in a common assembly to constitute a compact, lightweight scan module;

(g) means for mounting the scan module in an interchangeable, modular manner in housings of different configuration; and (h) means for converting one of the housings for use by a specific hand of a user, said converting means including means for steering the light beam to one of two courses.

5. An arrangement as defined in claim 4 wherein said means for converting comprises a superstructure portion which is mounted on a body of said one housing containing the scan module.

6. An arrangement as defined in claim 5, wherein said one housing is of rectangular cross-section and said superstructure portion is detachably mounted at one end of said one housing.

7. An arrangement as defined in claim 5, wherein said superstructure portion includes a reflecting mirror for directing the light beam.

8. An arrangement as defined in claim 5, wherein said superstructure portion is rotatably mounted on said one housing.

9. The arrangement as recited in claim 5, wherein said one housing is a hand-held terminal having a keyboard and a display.

10. The arrangement as recited in claim 5, wherein said one of the housing includes a read-control component for initiating scanning.

11. The arrangement as recited in claim 5, wherein said the housing has a cylindrical shape and is sized to be held in a user's hand.

12. A system for reading bar code symbols or the like, comprising:

(a) a hand-held scanning unit in a lightweight, portable housing including symbol-detection means for generating a laser beam directed toward a symbol to be read, and for receiving reflected light from such symbol to produce electrical signals corresponding to data represented by the symbol; and read-control means to actuate said symbol-detection means to initiate reading of a symbol; and (b) a beam directing unit directly mounted on said scanning unit in more than one position, including a reflecting mirror for receiving the laser beam transferred from the symbol-detection means of said scanning unit, and an exit port jointly movable with the beam directing unit so as to adapt the housing to steer the laser beam through the exit port to a particular course during hand-held operation.

13. A system as defined in claim 11 wherein said symbol-detection means includes scanning means for repetitively scanning said laser beam over at least a portion of a symbol to be read.

14. A system as defined in claim 11, wherein said symbol-detection means includes photodetector means for detecting at least a portion of the light of variable intensity of each scanned laser beam reflected from each symbol.

15. In a hand-held bar code reader in which a light beam is emitted from an exit port of a beam directing portion directly mounted in more than one position on a stationary portion of a housing toward a bar code to be read, the improvement which comprises means for changing the overall direction of the emitted beam with respect to the housing by relatively rotating the beam directing portion and the stationary portion during hand-held operation.

16. The improvement according to claim 15, wherein said means for changing the overall direction includes means for changing the direction of the light beam from one side of the housing to the opposite side of the housing.

17. The improvement according to claim 16, in which said housing is a small, hand-held housing.

18. The improvement according to claim 17, in which said means for changing the overall direction includes a superstructure with a reflective mirror for the beam, said superstructure being adjustably mounted on the housing, so that the beam reflected from the mirror will be directed out from different side positions of the housing, depending on the adjusted position of the superstructure.

19. The improvement according to claim 18, in which in one adjusted position of the superstructure, the beam will pass out from one side of the housing, and in a second adjusted position of the superstructure, the beam will pass out from the opposite side of the housing.

20. A system for reading bar code symbols or the like, comprising:

(a) a hand-held terminal unit in a lightweight, portable housing including means for manually entering data and means for displaying data; and (b) a scanning light beam emitting unit directly mounted on said terminal unit in more than one position and including an exit port jointly movable with the beam emitting unit and beam-directing means for directing a scanning beam through the exit port toward a symbol to be read along a particular course during hand-held operation, and for receiving reflected light from such symbol for producing electrical signals corresponding to data represented by the symbol.

21. A system as defined in claim 20, wherein said means for manually entering data includes a keyboard, and said scanning light beam emitting unit emits a laser beam.

22. A system as defined in claim 21, wherein said laser beam emitting unit is mountable on said terminal unit in two positions to direct the laser beam either to one side of the housing, or to a direction 180° from said one side.

23. A system as defined in claim 20, wherein said terminal unit includes laser beam generating means for generating a laser beam.

24. A system as defined in claim 23, wherein said terminal unit includes photodetector means for detecting at least a portion of the light of variable intensity of the scanning beam reflected from the symbol.

25. A system as defined in claim 20, wherein said terminal unit includes scanning means for producing the scanning beam.

26. A system as defined in claim 20 wherein said beam-directing means is a mirror.

* * * * *